(12) United States Patent
Rolle

(10) Patent No.: US 11,113,417 B2
(45) Date of Patent: Sep. 7, 2021

(54) DYNAMIC DATA ANONYMIZATION USING TAINT TRACKING

(71) Applicant: SAP SE, Walldorf (DE)

(72) Inventor: Benny Rolle, Karlsruhe (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 16/032,067

(22) Filed: Jul. 10, 2018

(65) Prior Publication Data

US 2020/0019728 A1 Jan. 16, 2020

(51) Int. Cl.
*G06F 21/62* (2013.01)
*G06F 11/30* (2006.01)
*G06F 21/56* (2013.01)
*G06F 16/22* (2019.01)

(52) U.S. Cl.
CPC ...... *G06F 21/6254* (2013.01); *G06F 11/3086* (2013.01); *G06F 16/2282* (2019.01); *G06F 21/56* (2013.01)

(58) Field of Classification Search
CPC .. G06F 11/3086; G06F 16/2282; G06F 21/56; G06F 21/6254
USPC .......................................................... 726/26
See application file for complete search history.

(56) References Cited

U.S. PATENT DOCUMENTS

| 8,627,483 | B2* | 1/2014 | Rachlin | G06F 21/6254 |
| | | | | 726/26 |
| 2017/0149793 | A1* | 5/2017 | Spertus | H04L 63/105 |
| 2017/0221081 | A1* | 8/2017 | Ollikainen | G06Q 30/0201 |
| 2018/0004978 | A1* | 1/2018 | Hebert | G06F 16/2457 |
| 2018/0307859 | A1* | 10/2018 | LaFever | G16H 10/60 |
| 2019/0286849 | A1* | 9/2019 | Oberhofer | G06F 16/21 |

OTHER PUBLICATIONS

Shelake et al., "A Survey of Privacy Preserving Data Integration", 2017 International Conference on Electrical, Electronics, pp. 59-70 (Year: 2017).*

(Continued)

*Primary Examiner* — Khalil Naghdali
(74) *Attorney, Agent, or Firm* — Fountainhead Law Group P.C.

(57) ABSTRACT

Dynamic data anonymization utilizes the introduction, tracking, and checking of taint information. During taint introduction, taint information relevant to a source of input data is bound with that data, and the taint information stored as metadata. During taint tracking, the taint information is maintained with the original data over its lifespan, and is also propagated with any derivative data generated from the original data. An anonymization procedure considers the taint information as semantic content to covert the data into anonymous form. Taint checking during anonymization determines whether a data object or a variable is tainted, and identifies the relevant taint information to allow the output of data in anonymous form. Introduction, tracking, and checking of semantic taint information permits embodiments to dynamically calculate anonymization metrics (e.g., k-anonymization, l-diversity) on the basis of the semantics of taint metadata that is actually present. This imparts resilience against accidental disclosure of privacy data.

10 Claims, 6 Drawing Sheets

(56) References Cited

OTHER PUBLICATIONS

Mendes et al., "Privacy-Preserving Data Mining: Methods, Metrics, and Applications", IEEE Digital Object Identifier 10.1109/ACCESS. 2017.2706947 Received Apr. 26, 2017, accepted May 15, 2017, date of current version Jun. 27, 2017 (Year: 2017).*
Cynthia Dwork, "Differential Privacy: A Survey of Results", International Conference on Theory and Applications of Models of Computation 2008, Apr. 2008, pp. 1-19.
Ashwin Machanavajjhala et al., "Diversity: Privacy Beyond k-Anonymity", Conference: Proceedings of the 22nd International Conference on Data Engineering, ICDE 2006, Apr. 3-8, 2006, 12 pages, Atlanta, GA, USA.
Sebastian Lekies et al., "25 Million Flows Later—Large-scale Detection of DOM-based XSS", CCS 2013 : ACM Conference on Computer and Communications Security, Nov. 4-8, 2013, 12 pages.
Latanya Sweeney, "k-Anonymity: A Model for Protecting Privacy1", School of Computer Science, Carnegie Mellon University, May 2002, 14 pages.
David Zhu et al., "TaintEraser: Protecting Sensitive Data Leaks Using Application-Level Taint Tracking", ACM SIGOPS Operating Systems Review archive, vol. 45 Issue 1, Jan. 2011, 13 pages.
Yu Zhu et al., "Privacy Scope: A Precise Information Flow Tracking System for Finding Application Leaks", Electrical Engineering and Computer Sciences University of California at Berkeley, Oct. 27, 2009, 16 pages.
Edward J. Schwartz, "All You Ever Wanted to Know About Dynamic Taint Analysis and Forward Symbolic Execution (but might have been afraid to ask)", Proceeding SP '10 Proceedings of the 2010 IEEE Symposium on Security and Privacy, May 16-19, 2010, 15 pages.
Landon P. Cox et al., "TaintDroid: An Information-Flow Tracking System for Realtime Privacy", 9th USENIX Symposium on Operating Systems Design and Implementation (OSDI'10), Oct. 4-6, 2010, 15 pages.
Minh Tran et a., "Tracking the Trackers: Fast and Scalable Dynamic Analysis ofWeb Content for Privacy Violations", International Conference on Applied Cryptography and Network Security, Jun. 26-29, 2012, 18 pages.

* cited by examiner

```
// Input of patient no. 1
var dateofbirth1 = tainted_copy("20.01.1985", "dateofbirth", "patient no. 1");
var sex1 = tainted_copy("m", "sex", "patient no. 1");
var postalcode1 = tainted_copy("76131", "postalcode", "patient no. 1");
var disease1 = tainted_copy("cough", "disease", "patient no. 1");

// Input of further patients
...
...

var data = [dateofbirth1, sex1, postalcode1, disease1, ...];
var k = 2;
var l = 2;
var quasiidentifying = ["dateofbirth", "sex", "postalcode"];
var sensitive = ["disease"];

var anonymised_data = anonymise(k, l, quasiidentifying, sensitive, data);
```

```
// Input of patient no. 1
var dateofbirth1 = tainted_copy("20.01.1985", "dateofbirth", "patient no. 1");
var sex1 = tainted_copy("m", "sex", "patient no. 1");
var postalcode1 = tainted_copy("7613", "postalcode", "patient no. 1");
var disease1 = tainted_copy("cough", "disease", "patient no. 1");

// Input of further patients
// ...
// ...

// The following lines could be a programming mistake!
var temp = disease1 + ":" + postalcode1 + ":" + dateofbirth1;
// Metadata of temp, derived by taint tracking:
// data_item="patient no. 1"
// attribute_id=["disease", "postalcode", "dateofbirth"]

// Overwrite disease1 with temp --> use metadata of temp
disease1 = temp;

var data = [dateofbirth1, sex1, postalcode1, disease1, ....];
var k = 2;
var l = 2;
var quasiidentifying = ["dateofbirth", "sex", "postalcode"];
var sensitive = ["disease"];

var anonymised_data = anonymise(k, l, quasiidentifying, sensitive, data);
```

DYNAMIC DATA ANONYMIZATION USING TAINT TRACKING

BACKGROUND

Unless otherwise indicated herein, the approaches described in this section are not prior art to the claims in this application and are not admitted to be prior art by inclusion in this section.

Enterprise software that is hosted on servers, may process personal data. Such software may thus be the subject of data protection regulatory schemes of various jurisdictions.

One principle allowing the compliant processing of personal data, may be data minimization. For example, pseudonymization is a technique to minimize the amount of processed personal data.

Pseudonymization may involve processing personal data such that it can no longer be attributed to a specific data subject without the use of additional information. Such additional information is kept separately and is subject to technical and organizational measures to ensure that the personal data are not attributed to an identified or identifiable natural person.

Another approach is anonymization. Anonymized data does not refer to an identified or identifiable person.

Accordingly, it is desirable that enterprise software be able to perform anonymization and/or pseudonymization operations reliably and accurately.

SUMMARY

Embodiments implement dynamic data anonymization through the introduction, tracking, and checking of taint information. Input data is originally received from a source. During taint introduction, taint information relevant to the source is bound with the data, and the data and associated taint information are stored together transparent to the application. During taint tracking, the taint information is maintained with the original data over its lifespan, and is also propagated with any derivative data generated from the original data. An anonymization procedure considers the taint information as semantic content in order to covert the data into anonymous form. During this anonymization, taint checking determines whether a data object or a variable is tainted, and identifies the relevant taint information, allowing the output of data in anonymous form. The introduction, tracking, and checking of semantic taint information allows for the dynamic calculation of anonymization metrics (e.g., k-anonymization, l-diversity) on the basis of the actual metadata that is present. This imparts robustness to the anonymization procedure against the accidental disclosure of private data or any other data that should not be contained in for example anonymized data (e.g., due to a programming error).

An embodiment of a computer-implemented method comprises receiving data from a source, introducing taint information based upon the source, and storing the taint information. The taint information is considered to generate an anonymized data set including at least part of the data, according to an anonymization metric. The anonymized data set is stored and communicated as output.

A non-transitory computer readable storage medium embodies a computer program for performing a method comprising receiving data from a source, introducing taint information based upon the source, and storing the taint information. The taint information is considered to generate an anonymized data set including at least part of the data, according to an anonymization metric comprising a sensitive attribute and a quasi-identifier. The anonymized data set is stored, and communicated as output.

An embodiment of a computer system comprises one or more processors and a software program executable on said computer system. The software program configured to cause an in-memory database engine to receive data from a source, introduce taint information based upon the source, and store the taint information in an in-memory database. The taint information is considered to generate an anonymous data set including at least part of the data, according to an anonymization metric. The anonymous data set is stored in the in-memory database and communicated as output.

In certain embodiments the anonymization metric comprises a sensitive attribute and a quasi-identifier.

According to some embodiments the anonymization metric comprises k-anonymity, l-diversity, or t-closeness.

Particular embodiments may further comprise generating derived data from the data, and propagating the taint information with the derived data, wherein the anonymized data set includes at least a portion of the derived data.

In various embodiments the taint information comprises an attribute semantic and a data object identifier, which may be a row identifier.

Certain embodiments may further comprise referencing the taint information to identify an injection security vulnerability.

According to some embodiments the taint information is stored within an in-memory database, and an in-memory database engine generates the anonymized data set.

The following detailed description and accompanying drawings provide a better understanding of the nature and advantages of embodiments.

BRIEF DESCRIPTION OF THE DRAWINGS

FIG. 3 is a first code listing showing anonymization according to k-anonymity and l-diversity metrics.

FIG. 4 is a second code listing showing propagation of taint information as semantic content to derived data.

DETAILED DESCRIPTION

Described herein are methods and apparatuses implementing data anonymization. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Dynamic data anonymization utilizes the introduction, tracking, and checking of taint information. During taint introduction, taint information relevant to a source of input data is bound with that data, with the taint information stored as metadata. The taint information may also describe the semantics of the data. During taint tracking, the taint information is maintained with the original data over its lifespan, and is also propagated with any derivative data generated from the original data. An anonymization procedure considers the taint information as semantic content in order to covert the data into anonymous form. Taint checking during anonymization determines whether a data object or a variable is tainted, and identifies the relevant taint information to allow the output of data in anonymous form. The introduction, tracking, and checking of semantic taint information permits embodiments to dynamically calculate anonymization metrics (e.g., k-anonymization, l-diversity) on the basis of the semantics of taint metadata that is actually present. This imparts resilience against accidental disclosure of privacy data.

Figure 1:
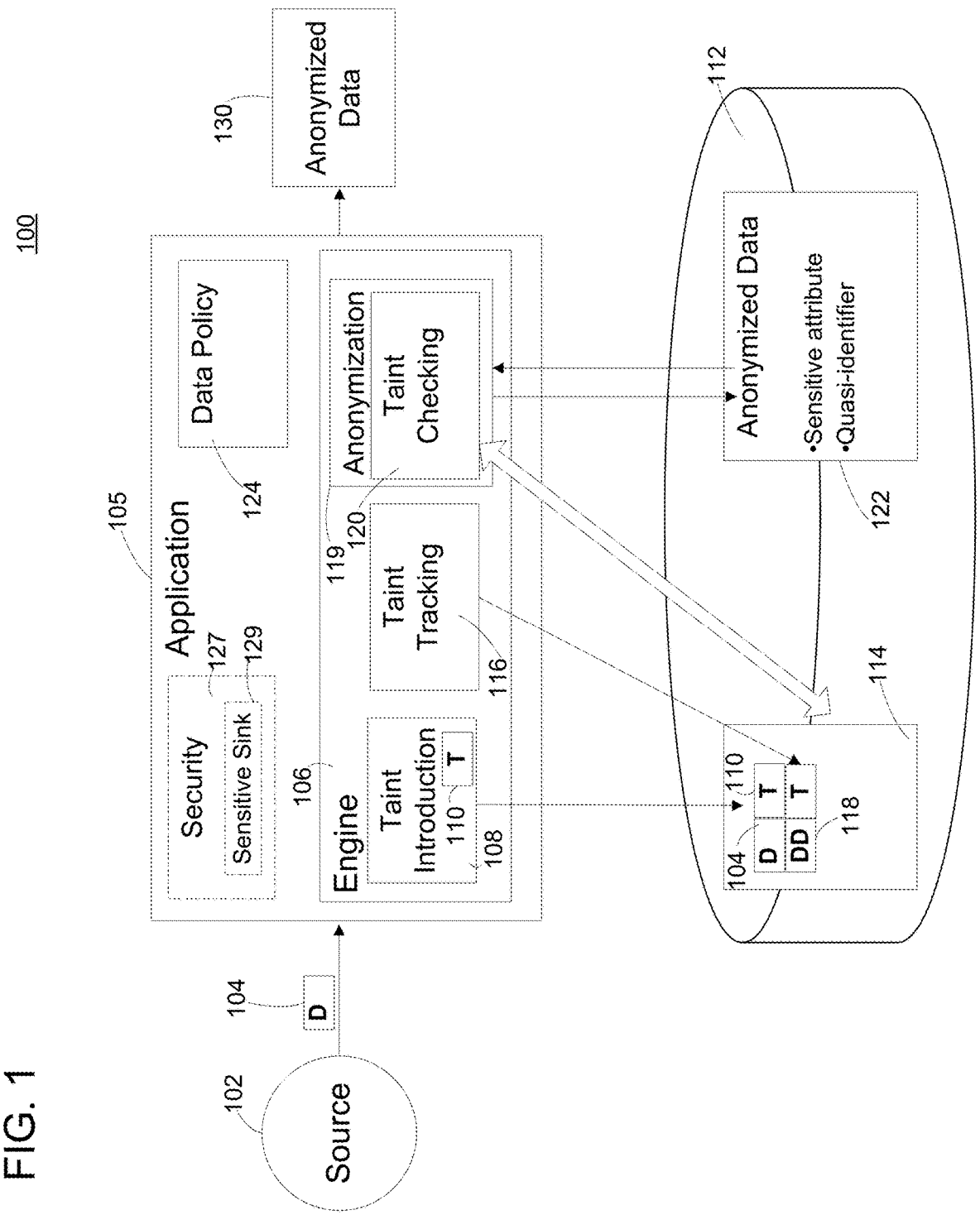
FIG. 1 shows a simplified diagram of a system according to an embodiment.

FIG. 1 shows a simplified view of a system according to an embodiment that is configured to implement dynamic data anonymization utilizing taint tracking. Specifically, system 100 comprises a source 102 that provides data (D) 104 to application 105.

As used herein, the term source refers to the location for entering or storing data. Examples of sources can include but are not limited to, a user interface, a database, an interface between different systems, a specific procedure, and other types of interfaces. In one particular embodiment, the source may comprise the OpenUI5 user interface framework that is available from OpenUI5.org.

Personal information regarding specific individuals is one possible form of data that is the subject of anonymization according to embodiments. Examples of such personal data can include (first and last) names, gender, ages, addresses, and/or identifying numbers (e.g., social security numbers).

However, embodiments as described herein are not limited to anonymization of personal data. In one example, data regarding particular nations could be stored: e.g., Country-Name, Geographic location (GPS), population, average salary.

For purposes of performing anonymization according to k-anonymity, the Country-Name, GPS, and population may be considered as quasi-identifiers, with the average salary being the sensitive attribute. The resulting anonymization of such a data table would not reveal which country has which average salary.

However, the anonymized data would permit useful findings, for example: "countries in the South have a higher average salary when the population is smaller, countries in the North have a higher salary when the population is bigger". (These example findings are fictitious and provided for illustration purpose only.) Thus in this example, the personal data of a particular individual would not be the subject of anonymization efforts.

The application includes an engine 106 that receives the incoming data, and performs taint introduction 108. The process of taint introduction refers to marking data as tainted, and associating additional information as taint metadata (T) 110 with that data. According to one particular example, the application may potentially be implemented as the Node.js® runtime available from the Node.js Foundation, which may be modified to be taint-aware.

As described below, this introduced taint information serves as semantic content that is considered in order to enhance robustness of a process for anonymizing the data. It is noted that taint information may also be introduced for other purposes such as the detection of injection-type security vulnerabilities—e.g., Cross-Site Scripting (XSS) or SQL Injection.

This data together with the associated taint metadata, may optionally be persisted by the engine in the database 112, for example as a non-anonymized table 114. In some embodiments, the database is a SQL database such as the HANA in-memory database available from SAP SE of Walldorf, Germany. Other database types can include big data platforms that are used for storing extremely large volumes, such as the MongoDB framework. Some embodiments may feature the engine in communication with multiple data stores, to allow selectively storing data according to factors such as cost, volume, and speed.

While FIG. 1 shows storage as a table in a database, this is not required. Tables may be employed because the data to be anonymized typically has the form of a table, but storage in a table is not required in all embodiments.

FIG. 1 further shows the engine performing the process of taint tracking 116 upon the stored data and associated (taint) metadata. Taint-tracking allows the dynamic monitoring of data-flows during program execution, supporting procedures such as anonymization and security vulnerability evaluation.

Moreover, taint-tracking preserves the tainted status of data thorough its lifetime. Accordingly, embodiments leverage taint-tracking in order to maintain the binding between the data to be anonymized, and the data-policy dictating that anonymization.

This taint-tracking includes operations that alter and/or duplicate the data value (e.g., incrementing an integer, or concatenating strings). The taint-data is also propagated to derivative data (DD).

Specifically, new variable values may be generated from operations on tainted data. Those new variable values are termed derivative data 118. The continued presence of the taint information that is ensured by the taint tracking process, allows the derivative data to be anonymized robustly and accurately as well.

FIG. 1 further shows the engine as performing an anonymization procedure 119 together with a taint-checking process 120 in order to create and then store data as an anonymous data table 122 within the database. Taint-checking refers to determining whether a data object or a variable is tainted, and identifying the relevant taint information.

The taint information may be checked and then utilized as part of a process for rendering data into anonymous form according to a data policy 124. Such a data policy may quantify data anonymity according to specific metrics such as k-anonymity, l-diversity, and/or t-closeness.

As described in detail below, the k-anonymity and l-diversity metrics characterize data anonymity in terms of sensitive attributes and corresponding quasi-identifiers. The additional consideration of taint information during the anonymization process, offers certain benefits such as robustness against programming errors inadvertently leaking privacy information.

As previously noted, the taint information may also potentially be useful in detecting injection security vulnerabilities. Accordingly, the application further includes an optional security module 127 that is configured to detect security vulnerabilities by referencing the taint information that has been introduced, such that only data from a trusted source flows to sensitive sink 129.

While the particular embodiment of FIG. 1 shows the security module as being external to the engine, this is not required. According to alternative embodiments, the security vulnerability evaluation could be performed by the engine itself.

Finally, FIG. 1 shows the output 130 of data rendered into anonymized form by the application. That anonymous data is in compliance with the dictates of the data policy, which in turn may be based upon the privacy regulations of particular jurisdictions.

While the particular embodiment of FIG. 1 shows the engine as being present in the application separate from the database, this is not required. According to some embodiments, the engine could be implemented in the form of an in-memory database engine present within the in-memory database. Such an embodiment would leverage the large processing power available to an in-memory database, for example the HANA in-memory database available from SAP SE of Walldorf, Germany.

And while the particular embodiment of FIG. 1 shows the data policy as being present in the application separate from the database, this is not required. According to certain embodiments the data policy could also be stored within the database (e.g., an in-memory database).

Figure 2:
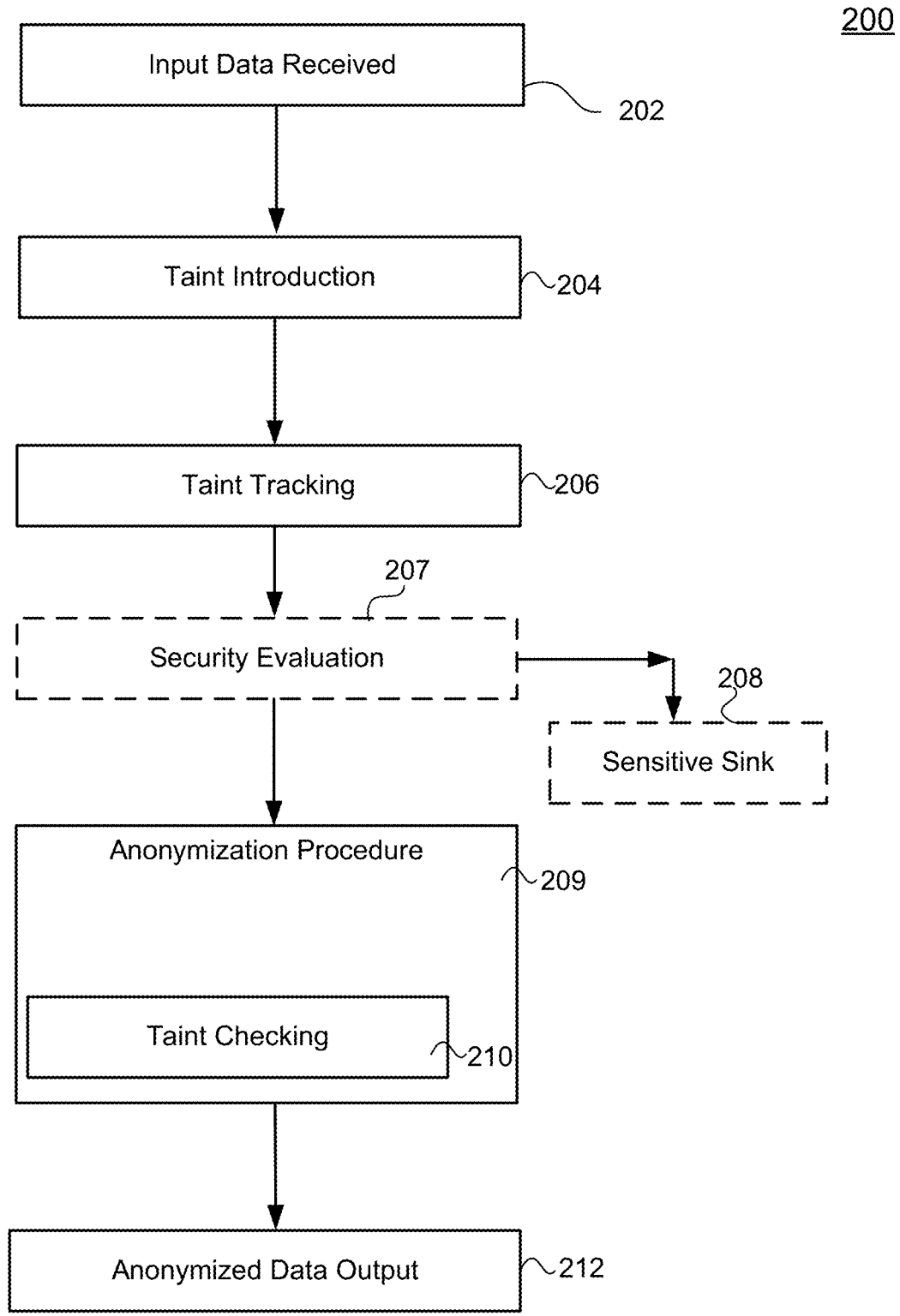
FIG. 2 shows a simplified flow diagram of a method according to an embodiment.

FIG. 2 is a flow diagram showing various actions taken in a method 200 according to an embodiment. At 202, data is received from a source. This source may be trusted or untrusted.

At 204, taint information associated with the data, is introduced. The data and the taint information as metadata, are stored in a database.

At 206, taint tracking is performed upon the data and the taint information. This taint tracking includes propagating the taint information to derived data.

As previously noted, the taint information may also potentially be useful in detecting injection security vulnerabilities. Accordingly, at 207 an optional security evaluation is performed referencing the taint information. At 208, only data from a trusted source flows into a sensitive sink.

The sensitive sink may or may not be the anonymization engine (in case of—but not limited to—the anonymization engine being vulnerable to injection vulnerabilities). In such cases, the security evaluation could be done before untrusted data flows into the anonymization component.

At 209, an anonymization procedure is performed on the data, considering the associated taint information as semantic content. As shown in 210, this anonymization procedure involves taint checking to determine whether a data object or a variable is tainted, and identifying the relevant taint information.

At 212, data anonymized according to a data policy is output.

Various details of implementing dynamic data anonymization using taint tracking according to embodiments, are now discussed in connection with the following example.

EXAMPLE

Dynamic anonymization utilizing taint tracking, is now described in connection with a highly simplified example of incoming personal health information for four patients, reflected in the following table.

| Date of birth | Sex | Postal code | Disease |
| --- | --- | --- | --- |
| 20.01.1985 | m | 76131 | cough |
| 01.08.1988 | m | 76136 | toothaches |
| 22.03.1981 | W | 76221 | depression |
| 18.08.1982 | W | 76226 | sniff |

Levels of possible anonymization in the above data set, may be quantified according to various different metrics. Examples of such data anonymity metrics include: k-anonymity, l-diversity, and t-closeness.

The k-anonymity and l-diversity metrics characterize anonymity in terms of two properties:
sensitive attribute; and
quasi-identifier.

Specifically, the k-anonymity and l-diversity metrics measure the inaccuracy of identifying a sensitive attribute (e.g., Disease) of data items, by a subset of attributes describing the data item. This subset of attributes is known as a quasi-identifier.

For the k-anonymity metric, the value of k describes the minimum number of different data items with the same quasi-identifier. The l-diversity metric describes using the variable l, the minimum number of different sensitive attributes assigned to one quasi-identifier.

Reliance upon such anonymization metrics like k-anonymity and l-diversity, require the explicit definition of sensitive attributes and quasi-identifiers. For example, the following table presents the above personal data in an anonymized form using:
sensitive attribute=Disease
quasi-identifier={Date of birth, Sex, Postal code}

| Date of birth | Sex | Postal code | Disease |
| --- | --- | --- | --- |
| xx.xx.198x | m | 7613x | cough |
| xx.xx.198x | m | 7613x | toothaches |
| xx.xx.198x | W | 7622x | depression |
| xx.xx.198x | W | 7622x | sniff |

Here, the value of k-anonymity=2. This is because two patients (#1 and #2) share the same subset of attributes {xx.xx.198x, m, 7613x} of the {Date of birth, Sex, Postal code}quasi-identifier.

The value of l-diversity=2. This is because all actual quasi-identifiers (i.e. {xx.xx.198x, m, 7613x} and {xx.xx.198x, W, 7622x}) have at least two different sensitive values. For quasi-identifier {xx.xx.198x, m, 7613x} the at least two values are "cough" and "toothaches". For quasi-identifier {xx.xx.198x, W, 7622x} the at least two values are "depression" and "sniff".

The above metadata anonymity definition (sensitive attribute, quasi-identifiers) is static in nature, and does not consider the actual semantics of the stored data. This can render the static anonymization approach vulnerable to unwanted leakage of private information.

Specifically, in the event of unforeseen events (e.g., unwanted data processing, programming mistakes, errors, etc.), the columns of data tables could end up containing unintended data. An example is given below:

| Date of birth | Sex | Postal code | Disease |
| --- | --- | --- | --- |
| xx.xx.198x | m | 7613x | cough 76131 20.01.1985 |
| xx.xx.198x | m | 7613x | toothaches 76136 01.08.1988 |
| xx.xx.198x | W | 7622x | depression |
| xx.xx.198x | W | 7622x | sniff |

Here, this anonymity definition could be the result of a programming mistake in defining the variable temp:
var temp=disease1+""+postalcode1+""+dateofbirth1;
Owing to this unintended programming error, the Disease column now also contains the •postal code and the •date of birth, for the patients #1 and #2.

However, according to static anonymization schemes based upon the k-anonymity and l-diversity metrics, data in the above table would continue to be considered as anonymized. That is:

k-anonymity=2 because two patients (#1 and #2) again share the same subset of attributes {xx.xx.198x, m, 7613x} of the {Date of birth, Sex, Postal code}quasi-identifier; and l-diversity=2 because all actual quasi-identifiers (i.e. {xx.xx.198x, m, 7613x} and {xx.xx.198x, W, 7622x}) have at least two different sensitive values. For quasi-identifier {xx.xx.198x, m, 7613x} the at least two values are "cough 76131 20.01.1985" and "toothaches 76136 01.08.1988". For quasi-identifier {xx.xx.198x, W, 7622x} the at least two values are "depression" and "sniff".

In reality, however, the sensitive attribute (Disease) has now inadvertently ended up containing personal, identifying data. That is, the •birth dates and •postal codes of patients #1 and #2, are undesirably ascertainable with their diseases. Such a data set may not be truly anonymized, potentially violating applicable regulatory requirements governing data privacy. Together with the value of "Sex", the whole table line is known.

By contrast, embodiments leverage taint-tracking as semantic content in order to enforce the accuracy and robustness of the data to be anonymized according to the data-policy. To accomplish this, data items are outfitted with additional information (the taint) upon entering the application through a source. The taint information is preserved through the full lifecycle of processing of the data, including the performance of operations that alter and/or duplicate the data value (e.g., incrementing an integer, or concatenating strings).

Moreover, under certain circumstances new variable values may be generated by operations on tainted data. Those new variable values are termed derivative data. Taint-tracking according to embodiments, automatically and robustly ensures that derivative data maintains the taint information coming from the original data sources.

The process of taint introduction refers to marking data as tainted, and storing additional information as metadata regarding that data. Taint-tracking refers to preserving the tainted status of data thorough its lifetime. Taint-checking refers to determining whether a data object or a variable is tainted, and identifying the relevant taint information.

Details regarding taint introduction are now described. Special data (such as personal data) may be tainted at the sources when it enters the application. Alternatively, taint metadata may be introduced after the data is received from the source.

According to some embodiments, the tainting operation binds the metadata to the data when the data enters the application. In other embodiments, however, taint metadata may be introduced later.

In one example, personal data of different individual patients may already be present within an application. Later, some of the data (e.g., as in the tables above) are stored within this table. Metadata can thus also be introduced at this subsequent point in time, subsequent to the original entry of the data into the application from a source.

According to another example, data flows into the application from a user interface. The data later flows through a method. When the data is returned from the method, the taint data could be introduced. The source in this case would be the method.

During the processing of the data in the application server, taint information is maintained and propagated to derivative data.

In this particular example, the following attributes are added as metadata:

data_item: this is an identifier of the data object—e.g., an identifier of a row in a database;

attribute_semantic: this is an identifier of the semantic of that particular data value (examples: Date of birth, Sex, Postal code, Disease).

The definition of metadata introduction can be customized. The software developer may define on a general level, those metadata values to be added to a variable. An example of such a definition could be:

(Data): the value of the user interface (UI) field "DATE OF BIRTH", is to be bundled with (Metadata): attribute_id=dateofbirth; and data_item=patient-number (row in the database).

Thus, for the patient #1 of the stored health information, the taint introduction may define the variable "dateofbirth1" as follows:

var dateofbirth=tainted_copy("20.01.1985", "dateofbirth", "patient no. 1");

This introduced taint information is accessible by the application program interface (API) of the taint-aware application server (e.g., a taint-aware version of Node.js).

Other examples of the introduction of taint information for the patient #1 in this example are as follows:

var sex1=tainted_copy("m", "sex", "patient no. 1");
var postalcode1=tainted_copy("76131", "postalcode", "patient no. 1");
var disease1=tainted_copy("cough", "disease", "patient no. 1").

This taint introduction is shown in a first code listing of FIG. 3. The programming language of the listing is JavaScript and pseudo-JavaScript. The listing of FIG. 3 indicates the anonymization using the k-anonymity and l-diversity anonymization metrics.

FIG. 3 shows that the persistence can be optional. In particular, the taint information is only stored within the engine, but the data about the patients and diseases is not persisted within a database.

FIG. 4 shows a second code listing. The programming language of the listing is again JavaScript and pseudo-JavaScript.

Here, in the event of the programming error in defining the variable temp:

var temp=disease1+" "+postalcode1+" "+dateofbirth1;

the second code listing of FIG. 4 depicts how the actual semantic is propagated to derived data, where disease1 is overwritten with temp:

disease1=temp;

Now, "disease1" has additional metadata. Specifically, the metadata of "disease1" is the metadata of the old "disease1", plus "postalcode1", and also "dateofbirth1".

Such retention of the semantic content according to embodiments, allows anonymization to be performed in an accurate and robust manner for that derived data as well.

In the example given, it is noted that employing the user interface framework (e.g., the "DATE OF BIRTH" UI field) as the source for purposes of generating the taint information, represents only one possible approach. Alternatively, system components other than the UI (e.g., an interface between different systems) could function as a source for purposes of generating the taint information for introduction.

In summary, according to embodiments input data is first bundled with metadata relating to taint tracking. This taint tracking is utilized to preserve the precise link between the data and metadata transparently and automatically during the lifespan of the data. In this manner, derivative data resulting from application level data processing remains outfitted with the correct taint metadata, without requiring explicit actions to be added to the application logic by the programmer. This conserves effort and reduces expense, particularly where taint information may already be introduced/checked/tracked for purposes of injection-type security vulnerability detection.

The anonymization metric definition sets forth those attribute sets which are quasi-identifying, and those attributes which are sensitive. During the anonymization according to embodiments, taint checking operations are used to read the taint metadata stored associated with the data. Accordingly anonymization metrics (e.g., k-anonymity, l-diversity) can be calculated on the basis of the actual metadata that is present.

The anonymization metric definitions may be individualized. For example, an anonymization metric can be defined to consider the attribute "disease" as sensitive, and the attribute set {dateofbirth, sex, postalcode} as quasi-identifying. The data_item definition is used to deduce those variables belonging to the same data object.

Accordingly, by considering dynamic taint information, the anonymization metrics can be calculated on the basis of current metadata, rather than upon static definitions.

It is noted that in certain embodiments, after anonymization the metadata can optionally be deleted from the anonymized data. With regards to the particular above example regarding patient data, this deletion is unnecessary because no personal information is stored within the metadata (only "patient #1").

In other cases, however, personal information could be stored within the metadata (e.g., the name "Max Mustermann" instead of "patient #1"). In such cases the anonymized data could still reveal the data subject, and so the metadata would be deleted in order to preserve anonymity.

While the particular example has been described in connection with the k-anonymity and l-diversity metrics, this is not required. Alternative embodiments could perform dynamic anonymization using taint tracking in connection with other metrics.

One example of another such anonymity metric is t-closeness. Accordingly, embodiments could consider introduced taint information as semantic content in the anonymization of data based upon data closeness properties.

Dynamic data anonymization according to various embodiments, may offer certain benefits over conventional approaches. For example, by performing anonymization using the current data semantic, embodiments are robust against programming mistakes that could inadvertently reveal personal data.

Another potential benefit of implementing dynamic anonymization according to embodiments, is flexibility. In particular, the transparency of the approach considering data semantics, can be applied to a variety of applications not intentionally developed for it. Thus the described anonymization features can readily be added to existing applications.

Still another potential benefit of dynamic anonymization is the ability to separate responsibilities. In particular, the metadata definition can be generated by a domain or privacy expert. That definition need not be created by the programmer.

Figure 5:
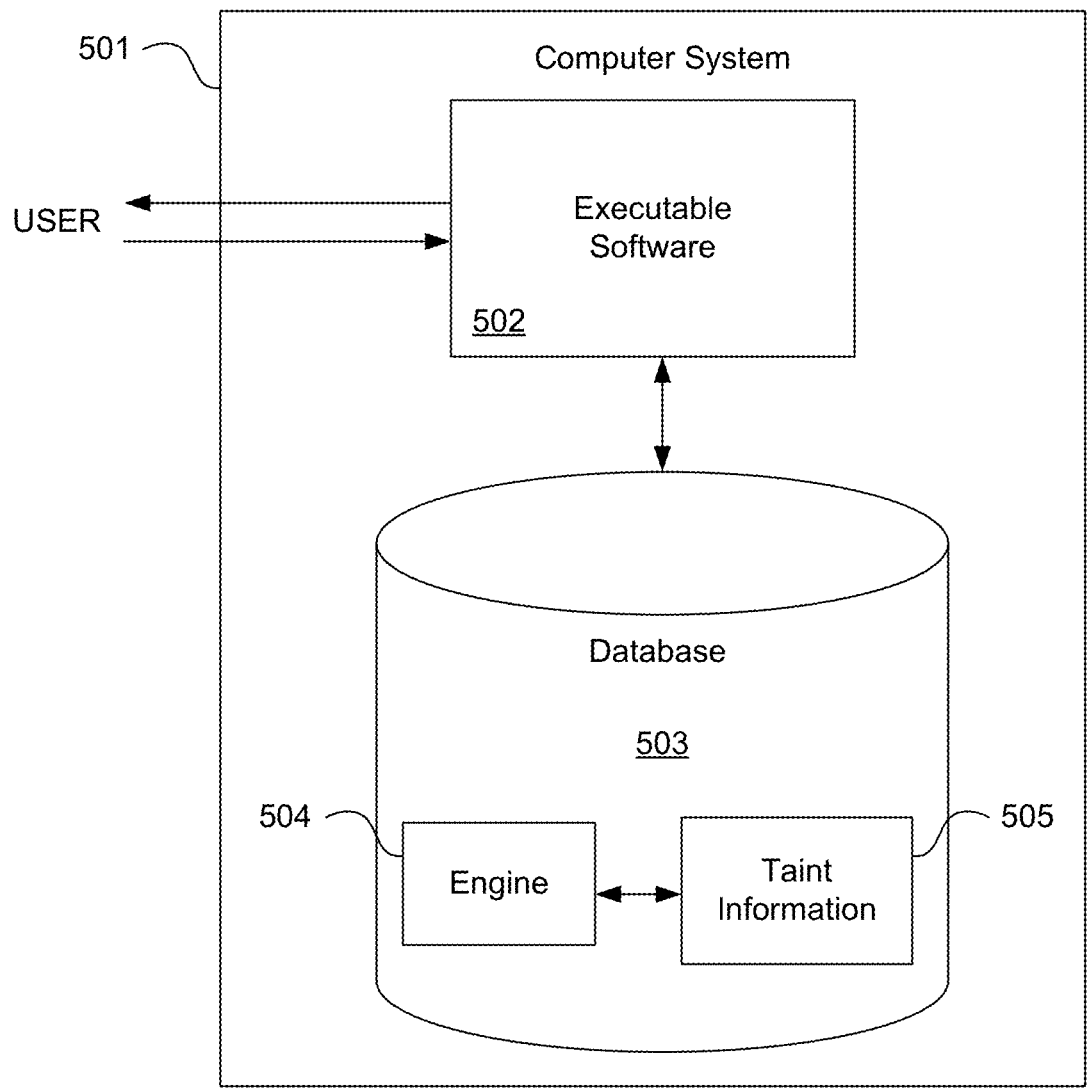
FIG. 5 illustrates hardware of a special purpose computing machine according to an embodiment that is configured to implement data anonymization according to an embodiment.

Certain embodiments may be implemented in connection with an in-memory database, with the in-memory database engine responsible for performing one or more actions implementing data anonymization. FIG. 5 illustrates hardware of a special purpose computing machine configured to implement dynamic data anonymization using taint tracking according to an embodiment. In particular, computer system 501 comprises a processor 502 that is in electronic communication with a non-transitory computer-readable storage medium comprising a database 503. This computer-readable storage medium has stored thereon code 505 corresponding to taint information. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
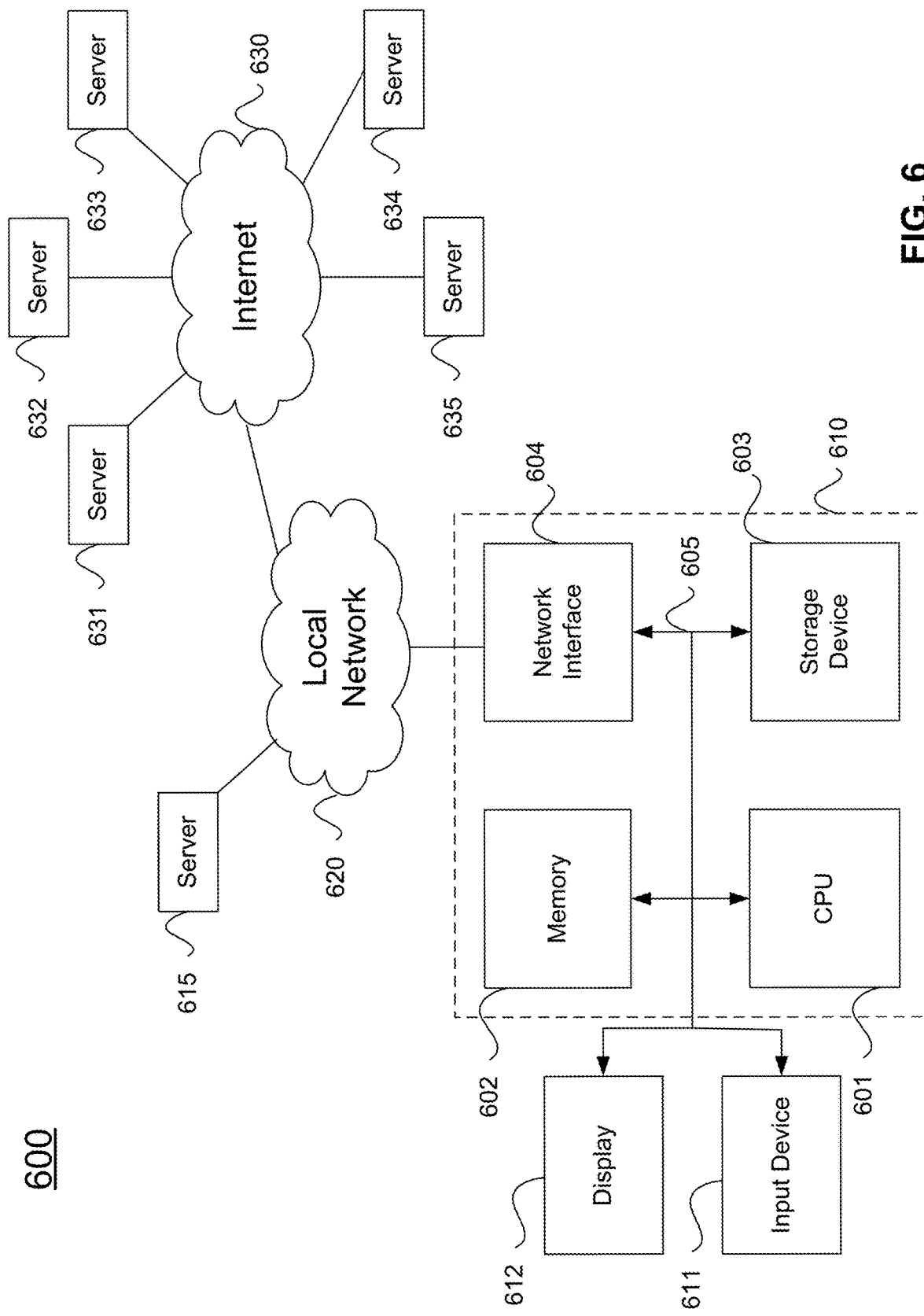
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving data from a database of a source;
introducing taint information based upon the source by bundling metadata associated with the data in the database, wherein the taint information comprises,
an attribute semantic, and
a data object identifier comprising a row identifier of the database;
storing the taint information;
generating derived data from the data and propagating the taint information with the derived data;
referencing the taint information to perform a security evaluation;
where the security evaluation reveals the source to be a trusted source, flowing the data to a sensitive sink; and
where the security evaluation reveals the source to be an untrusted source,
considering the taint information to generate an anonymized data set including at least part of the data, according to an anonymization metric;
storing the anonymized data set; and
communicating the anonymized data set as output, wherein the anonymized data set includes at least a portion of the derived data.

2. A method as in claim 1 wherein the anonymization metric comprises a sensitive attribute and a quasi-identifier.

3. A method as in claim 2 wherein the anonymization metric comprises k-anonymity.

4. A method as in claim 2 wherein the anonymization metric comprises l-diversity.

5. A method as in claim 1 wherein the anonymization metric comprises t-closeness.

6. A method as in claim 1 wherein:
the taint information is stored within an in-memory database; and
an in-memory database engine generates the anonymized data set.

7. A non-transitory computer readable storage medium embodying a computer program for performing a method, said method comprising:
receiving data from a database of a source;
introducing taint information based upon the source by bundling metadata associated with the data in the database, wherein the taint information comprises,
an attribute semantic, and
a data object identifier comprising a row identifier of the database;
storing the taint information;
generating derived data from the data and propagating the taint information with the derived data;
referencing the taint information to perform a security evaluation;
where the security evaluation reveals the source to be a trusted source, flowing the data to a sensitive sink; and
where the security evaluation reveals the source to be an untrusted source,
considering the taint information to generate an anonymized data set including at least part of the data, according to an anonymization metric comprising a sensitive attribute and a quasi-identifier;
storing the anonymized data set; and
communicating the anonymized data set as output, wherein the anonymized data set includes at least a portion of the derived data.

8. A non-transitory computer readable storage medium as in claim 7 wherein the anonymization metric comprises k-anonymity or l-diversity.

9. A computer system comprising:
one or more processors;
a software program, executable on said computer system, the software program configured to cause an in-memory database engine to:
receive data from a database of a source;
introduce taint information based upon the source by bundling metadata associated with the data in the database, wherein the taint information comprises,
an attribute semantic, and
a data object identifier comprising a row identifier of the database;
store the taint information in an in-memory database;
generate derived data from the data and propagate the taint information with the derived data;
referencing the taint information to perform a security evaluation;
where the security evaluation reveals the source to be a trusted source, flow the data to a sensitive sink; and
where the security evaluation reveals the source to be an untrusted source,
consider the taint information to generate an anonymized data set including at least part of the data, according to an anonymization metric;
store the anonymous data set in the in-memory database; and
communicate the anonymized data set as output, wherein the anonymized data set includes at least a portion of the derived data.

10. A computer system as in claim 9 wherein the anonymization metric comprises k-anonymity or l-diversity.

* * * * *